United States Patent [19]

Bateman

[11] Patent Number: 4,506,328

[45] Date of Patent: Mar. 19, 1985

[54] STATIC LOW TIRE PRESSURE DETECTION SYSTEM FOR AIRCRAFT

[75] Inventor: Charles D. Bateman, Bellevue, Wash.

[73] Assignee: Sundstrand Data Control, Inc., Rockford, Ill.

[21] Appl. No.: 403,454

[22] Filed: Jul. 30, 1982

[51] Int. Cl.³ .............................................. B06C 23/00
[52] U.S. Cl. ...................................... 364/463; 340/58
[58] Field of Search .................. 364/463, 567; 340/58; 73/146, 65; 244/100 R

[56] References Cited

U.S. PATENT DOCUMENTS

| | | |
|---|---|---|
| 2,358,370 | 9/1944 | Williams . |
| 3,614,122 | 10/1971 | Herren . |
| 3,801,787 | 4/1974 | Johnsen . |
| 3,900,828 | 8/1975 | Lage et al. . |
| 4,224,597 | 9/1980 | DiGecio ............................... 340/58 |
| 4,269,070 | 5/1981 | Nelson et al. . |
| 4,283,707 | 8/1981 | Church ................................ 340/58 |
| 4,312,042 | 1/1982 | Bateman . |
| 4,421,052 | 12/1983 | Cook .................................. 340/58 X |

*Primary Examiner*—Edward J. Wise

*Attorney, Agent, or Firm*—Wood, Dalton, Phillips, Mason & Rowe

[57] ABSTRACT

A static low tire pressure detection system for detecting the presence of a low tire mounted on a structural member of an aircraft, such as a bogie beam or nose axle, includes a pair of inclinometers mounted on the structural member and adapted to sense the bend therein. The signals from the inclinometers are stored in a memory once the aircraft is at rest on the ground to provide reference signals indicating the angle of the structural member with respect to an inertial reference and the weight carried thereby. The reference signals are compared against later-developed signals representing instantaneous angle and weight on the structural member to develop difference signals. The difference signals are used to generate an indication of tire pressurization, which is then checked to determine whether the tire pressurization is within acceptable limits. If the tire pressure is outside of the acceptable limits, then an indicating device is energized to provide a warning of a potentially dangerous condition to the aircraft operating personnel.

17 Claims, 7 Drawing Figures

STATIC LOW TIRE PRESSURE DETECTION SYSTEM FOR AIRCRAFT

DESCRIPTION

Background of the Invention

The present invention relates generally to low tire pressure detection systems for aircraft, and more particularly to a system for detecting and indicating an underpressured tire on an aircraft landing gear while the aircraft is motionless on the ground.

It is extremely important that all of the tires carried by aircraft landing gear are properly pressurized to insure safe and reliable takeoff and landing procedures. Often, this safety consideration requires personnel to visually inspect the landing gear and to measure and check individual tire pressures prior to takeoff. These visual inspections and measurements can be difficult to accomplish under severe conditions such as extreme winter weather.

A successful system for generating an indication of low tire pressure is shown and described in Bateman U.S. Pat. No. 4,312,042, entitled "Weight, Balance and Tire Pressure Detection Systems", and assigned to the assignee of the instant application. This system utilizes two pairs of inclinometers mounted on a structural member carrying the landing gear tires with the sensitive axes of one pair of inclinometers being disposed at right angles to the sensitive axes of the other pair. The signal outputs from the first pair of inclinometers are subtracted to generate a signal indicating the tilt of the structural member. The signal outputs from the second pair of inclinometers are combined to generate a signal indicating the torsion in the structural member. The tilt and torsion signals are used to locate a particular tire of the set of tires carried by the structural member which is underpressurized.

While the system described above is capable of detecting an underpressurized tire, it has been found that the sensitivity of the system is limited by the variation in parking, taxiway and runway surfaces and slopes. Since the variation in these factors may be extreme, the system must be adjusted to generate a low tire pressure indication when the tire is essentially flat, e.g. when a loss of 130 psi has occurred in a normally inflated 185 psi pressurized tire. However, even when the system is set to detect such a large loss of pressurized air, nuisance warnings of a possible flat tire may occur approximately once every 50 flight segments, chiefly at specific airports and gate positions. It is desirable to reduce this frequency of erroneous indications.

SUMMARY OF THE INVENTION

In accordance with the present invention, a static low tire pressure detection system for detecting the presence of a low tire while the aircraft is not moving utilizes output signals developed by one or more pairs of inclinometers mounted on each aircraft weight supporting structure, such as a bogie beam or axle. The tilt angle of the beam or axle and the weight supported thereby are "remembered" after the last airplane movement. Subsequent measurements of axle or beam tilt angle are compared with the "remembered" angle and weight information to develop difference signals which are independent of variation in parking taxiway and runway surfaces and slope.

The angle difference signal is coupled to an amplifier having a variable gain which is dependent upon the sensed weight carried by the associated structural member. The amplifier develops a signal, corrected for the loading on the member, representing the angle of the structural member with respect to an inertial reference plane. If the amplifier signal indicates that the angle is greater than a predetermined value, an output signal is generated indicating low tire pressure.

Moreover, the angle and weight difference signals are used to address a lookup table which outputs a second value representing tire pressure. The second tire pressure value is then analyzed to determine whether it lies outside of the range of acceptable pressures. If this is the case, then the output signal is generated to provide an indication of low tire pressure.

The values stored in the lookup table are empirically determined for each type of aircraft with which the system is to be used. The use of individualized information stored in the lookup table results in a system which is highly sensitive to changes in tire pressure and yet provides a large margin against nuisance warnings. Moreover, the system is capable of sensing a low tire pressure condition regardless of the slope of the surface on which the aircraft is resting.

DESCRIPTION OF THE PREFERRED EMBODIMENT

Figures 1, 2:
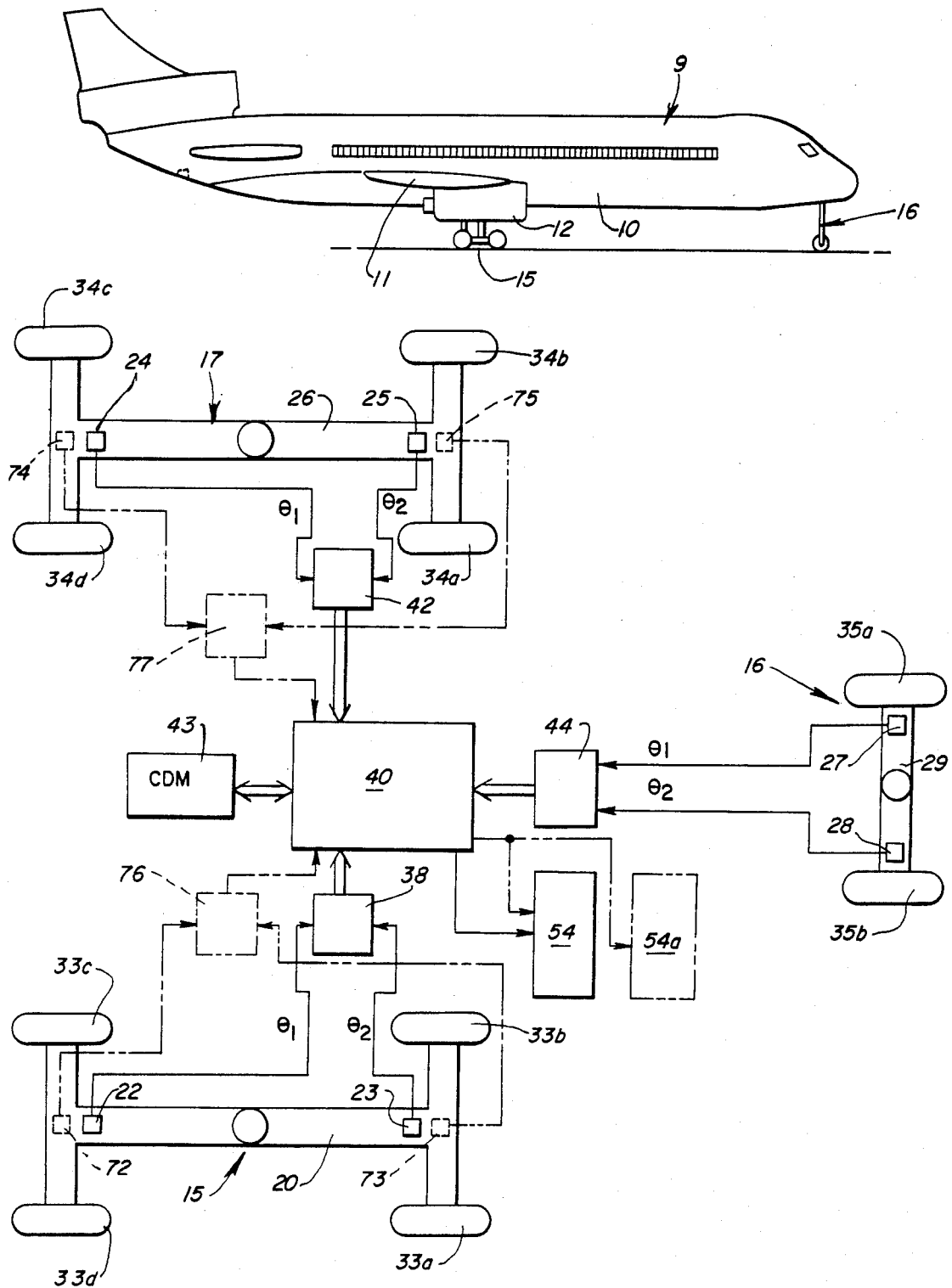
FIG. 1 is a side elevational view of a typical aircraft with which the invention disclosed herein is used.
FIG. 2 is a diagrammatic plan view of an aircraft landing gear in conjunction with a block diagram showing the system of the present invention.

Referring now to FIG. 1, an aircraft, indicated generally at 9 includes a fuselage 10 and a pair of wings 11 each of which mounts a jet engine 12. Referring also to FIG. 2, in the illustrated embodiment, the aircraft 9 includes a nose gear 16 and a pair of retractable main landing gear 15,17 supported from the aircraft wing.

The sensing of a low tire pressure condition for each of the landing gear 15,16,17 is accomplished by sensing the amount of deflection or bend in the structural weight-supporting members such as the bogie beams 20,26 of the main landing gear 15,17 and the axle 29 of the nose gear 16.

The angle of bending of the structural member, such as the bogie beam 20, is proportional to the weight or force on the member. The weight on the member and the angle the member forms with respect to an inertial reference plane may be used to develop an indication of the pressurization of the tires carried by the member.

Figure 3:
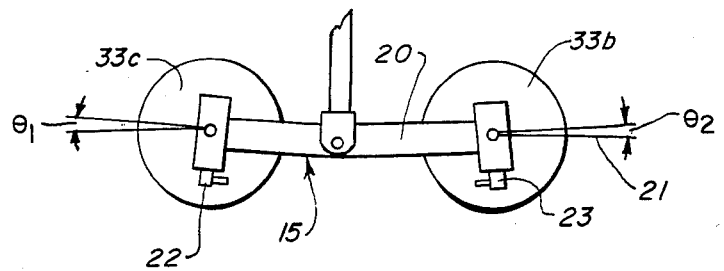
FIG. 3 is a diagrammatic view of the main landing gear shown in FIG. 1.

Referring to the schematic view of the main landing gear 15, shown in FIG. 3, the bogie beam 20 is shown with an exaggerated bend to illustrate the principles of the invention. An inertial reference plane is indicated by a horizontal, broken line 21. The angle of bending of the beam is represented by the reference angles $\theta_1$ and $\theta_2$. The angles $\theta_1$ and $\theta_2$ are sensed by transducers 22,23 which may be inclinometers, or other transducers capable of developing signals representing the angle of bend of the member at first and second locations with respect to the inertial plane. Alternatively, the stress in the structural member 15-17 may be sensed by various methods including strain gages or variable reluctance sensors. In this case, the signal outputs from the variable reluctance sensors may be utilized to generate an indication of tire pressurization, as noted more specifically below.

In the preferred embodiment, the transducers 22,23 are servoed accelerometers which directly sense the angles $\theta_1$ and $\theta_2$, such as that disclosed in U.S. Pat. No. 3,702,073, the disclosure of which is hereby incorporated by reference.

The accelerometers 22,23 are rigidly attached to the bogie beam 20 at opposite ends thereof. The sensitive axes of the accelerometers 22,23 are aligned 180° with respect to one another and parallel to the longitudinal axis of the beam 20 when no load is applied thereto. As seen in FIG. 2, similar accelerometers 24,25 are mounted on the bogie beam 26 of the main landing gear 17, while accelerometers 27,28 are mounted on the axle 29 of the nose gear 16. In each case, the sensitive axes of each pair of accelerometers 24,25 or 27,28 are disposed 180° with respect to one another and are mounted on opposite ends of the structural member.

The mounting of the inclinometers 22-25, 27 and 28 on the structural members 20,26,29 is shown more particularly in Bateman U.S. Pat. No. 4,312,042, the disclosure of which is hereby incorporated by reference.

The angles $\theta_1$ and $\theta_2$ sensed by each pair of accelerometers contain components dependent upon: (1) the angle of the beam or axle caused by a low tire pressure condition or by airport ramp or runway tilt; (2) the beam bend angles caused by a load applied thereto; and (3) sensor axis misalignment and bias errors. In general, the angles $\theta_1$ and $\theta_2$ are defined as follows (formulas 1 and 2):

$$\theta_1 = \theta_B + \theta_{L1} + \theta_{A1} \quad (1)$$

$$\theta_2 = -\theta_B + \theta_{L2} + \theta_{A2} \quad (2)$$

In the foregoing equations, $\theta_B$ is the angle of the beam or axle caused by a low tire pressure condition or by airport ramp or runway tilt. $\theta_{L1}$ and $\theta_{L2}$ are the beam bend angles caused by a load. $\theta_{A1}$ and $\theta_{A2}$ are sensor axis misalignment and bias terms.

As previously noted, the outputs of the accelerometers on each bogie beam, such as the accelerometers 22,23, are combined to obtain a weight signal W and an angle signal A representing the angle or tilt of the beam.

The weight signal W is proportional to the weight applied to the structural member; e.g. the bogie beam 15, and is obtained by summing the outputs of the accelerometers 22,23 to derive the following result:

$$W = \theta_1 + \theta_2 = \theta_{L1} + \theta_{L2} + \theta_{A1} + \theta_{A2}$$

Referring specifically to bogie beam 20, the outputs of the two servoed accelerometers 22,23 are summed to cancel out the beam angle $\theta_B$ caused by airport ramp or runway tilt. The alignment factors $\theta_{A1}, \theta_{A2}$ are measured during automatic zeroing of the system in flight and do not affect the calculation. In summary, weight on the bogie beam or the nose gear axle is proportional to the sum of the output signals of the two accelerometers associated therewith.

The bogie beam tilt angle with respect to the inertial reference plane may be measured by subtracting $\theta_2$ from $\theta_1$:

$$\theta_1 - \theta_2 = 2\theta_B + \theta_{A1} - \theta_{A2}$$

In this equation, $\theta_{L1}$ and $\theta_{L2}$, which represent the bend angles caused by the load on the structural member are equal and cancel out. $\theta_{A1} - \theta_{A2}$ is due to alignment error which the system automatically measures and corrects. The resulting angle signal A is proportional to the angle which the structural member, e.g. bogie beam 20, makes with respect to the inertial reference plane.

As seen in FIG. 2, each of the main landing gears 15,17 has four tires 33a-33d,34a-34d while the nose gear 16 carries two tires 35a,35b. The tilt angle of one of the structural members 20,26,29 with respect to the inertial reference plane will be small if all the tires associated therewith are properly pressurized. Moreover, the tilt angle of the structural member should not change to any appreciable extent when the aircraft is loaded or unloaded. However, when one of the tires, for example tire 33a on bogie beam 20, is underpressurized, then the tilt of the associated bogie beam 20 will be different than when all the tires are properly pressurized. For example, in a typical application, a 75% depressurized tire causes a bogie beam tilt of about 1.4°.

Furthermore, if the aircraft weight changes when one of the tires is underpressurized, the tilt of the structural member will change significantly as the weight changes. This tilt change is detected by the system of the present invention, as noted more specifically below.

The outputs from the accelerometers mounted on each structural member, for example accelerometers 22,23 associated with the bogie beam 20, are coupled to computing circuits 38 which perform the adding and subtracting functions to derive the weight and angle signals. These signals A and W are then coupled to a computer 40 which receives weight and angle signals from similar computing circuits 42,44 associated with the accelerometers mounted on the bogie beam 26 and the nose axle 29. The computer 40 is also interactively coupled to a command data module, or CDM 43 which is a memory unit in which is stored various types of information, as will be described in greater detail hereinafter. The CDM 43 is a nonvolatile storage unit consisting of read only memory units (ROM) or erasable programmable read only memory units (EPROM). Since the low tire pressure detection system of the present invention operates only while the aircraft is not moving, it is important to have a nonvolatile memory in the CDM 43 to prevent the loss of information which may occur during power shutdown.

Figure 4A:
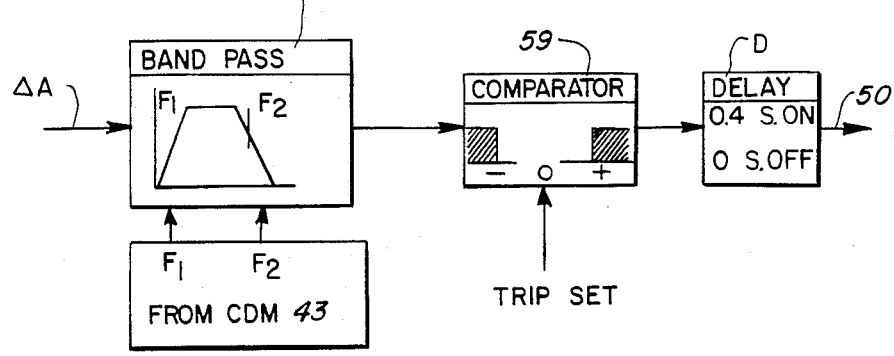
FIG. 4a is a block diagram of circuitry for generating a motion inhibit signal coupled to the line 50 shown in FIG. 4.
Figure 4:
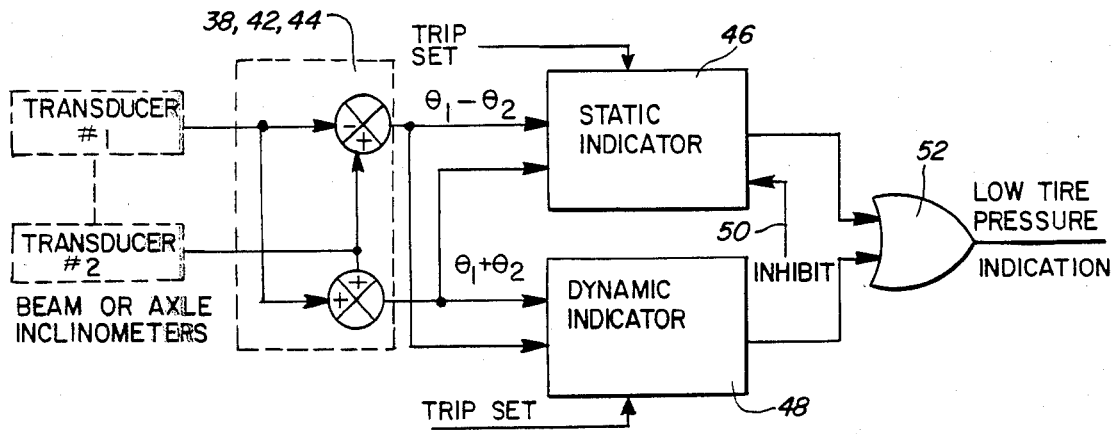
FIG. 4 is a block diagram of a combined dynamic and static low tire pressure detection system incorporating the system of the present invention.

Referring also to FIG. 4, there is illustrated a low tire pressure indicator system 44 which incorporates as a portion thereof the static low tire detection system of the present invention. The indicator system 44 also includes a dynamic low tire pressure detection system which is operative during taxiing or other movement of the aircraft on the ground. A detailed description of the dynamic detection system is contained in the copending patent application of Pulk et al, Ser. No. 403,437, filed July 30, 1982, entitled "Dynamic Low Tire Detection System for Aircraft", and assigned to the assignee of the instant application.

Briefly, the angle and weight signals A and W developed by the computing circuits 38, 42 or 44 are coupled to a static indicator 46 and to a dynamic indicator 48, only one of which is operative at any particular time. For example, when the aircraft is moving on the ground, the dynamic indicator 48 is actuated, and the static indicator is de-actuated by an inhibit signal on a line 50. The circuitry for generating the inhibit signal is described hereinafter.

Both of the static and dynamic indicators 46,48 receive trip set signals which represent a range of acceptable tire pressures. If a tire pressure is sensed outside of this range, a signal is generated by either of the indicators 46,48. The outputs from the static and dynamic indicators 46,48 are coupled to an OR gate 52 which develops a signal indicating the presence or absence of a depressurized tire.

The functions performed by the static and dynamic indicators 46,48 are implemented in the computer 40 shown in FIG. 2, which may be an analog or general purpose digital computer. The computer 40 may drive an output device 54 such as a cathode ray tube, an indicator light, an audible alarm or the like, to provide an indication of low tire pressurization.

Figure 6:
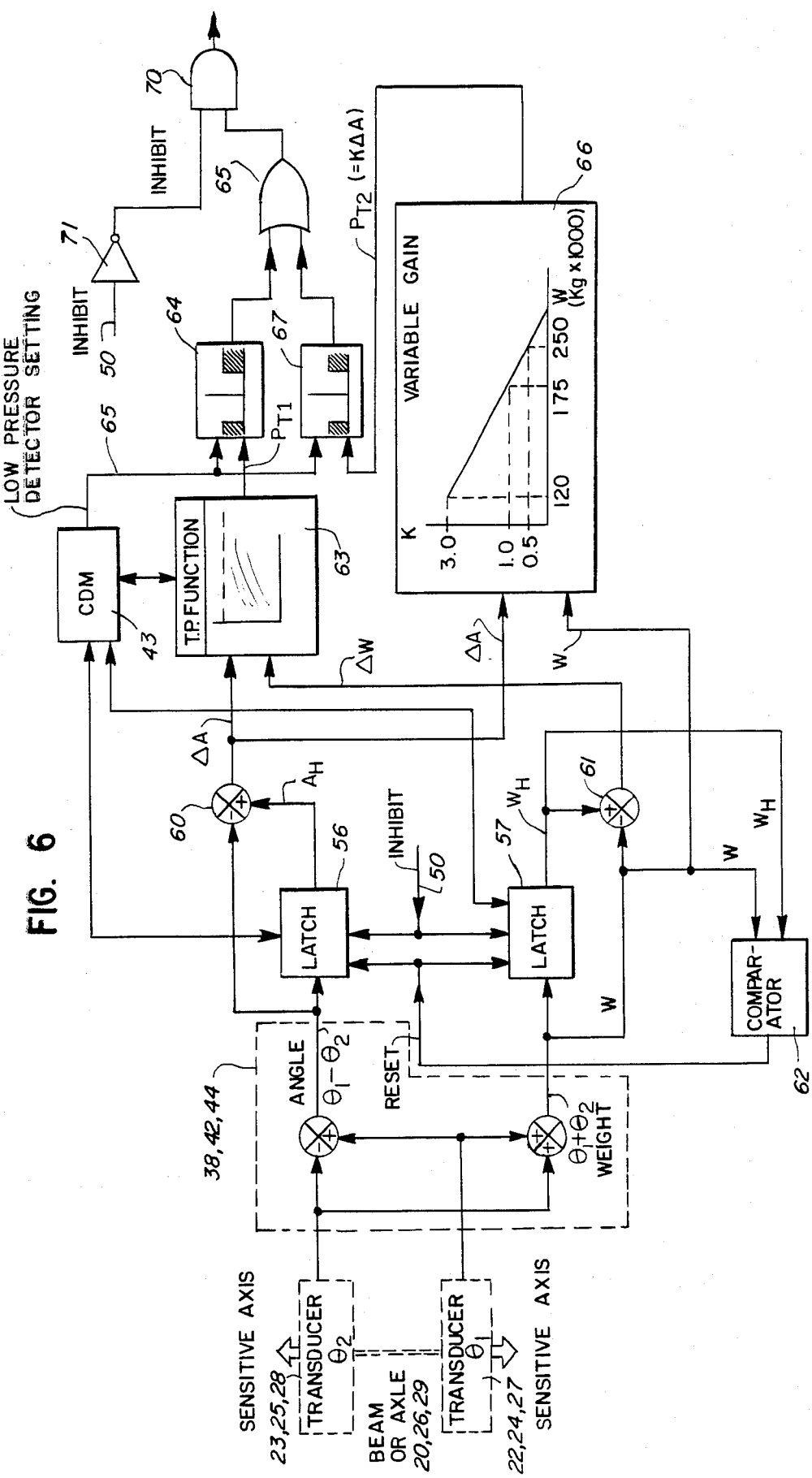
FIG. 6 is a block diagram of a portion of the system of FIG. 4 comprising the system of the present invention.

Referring now to FIG. 6, there is illustrated in block diagram form the static indicator 46 shown in FIG. 4. It should be noted that the outputs from each pair of transducers are processed in exactly the same way by the computer 40, and hence the circuitry in FIG. 6 will be described only in connection with the accelerometers 22,23 associated with the bogie beam 20.

The signals from the transducers 22,23 are coupled to the computing circuits 38, which derive the weight and angle signals W,A discussed above. These signals are coupled to first and second hold or latch circuits 56,57 which are operative to store the current value of these signals in the CDM 43 when the inhibit signal appearing on the line 50 is removed.

Referring also to FIG. 4a, there is illustrated in block diagram form circuitry for generating the inhibit signal coupled to the line 50. The circuitry receives a signal $\Delta A$, described in greater detail hereinafter, representing the change in beam or axle tilt, and analyzes the signal to determine whether the aircraft is moving on the ground. The signal $\Delta A$ is filtered in a band-pass circuit 58 to derive a filtered signal which contains particular frequency components when the aircraft is moving. In a typical application, for a DC 10 aircraft, the frequency components of interest are different for the nose axle than for the main gear bogie beams. The band-pass filter receives band-pass limit frequencies $F_1, F_2$ stored in the CDM 43 as follows:

| Strut | $F_1$ | $F_2$ |
|---|---|---|
| Nose axle | 0.1 hz. | 5.0 hz. |
| Bogie beam | 0.05 hz. | 20 hz. |

The band pass filter is a third order filter which is in effect a pseudo double-integrator which converts the acceleration information $\Delta A$ into distance information. It should be noted that the limit frequencies $F_1$ and $F_2$ are dependent upon axle and beam geometry, and may be different than those noted above for other types of aircraft.

The determination of whether the aircraft is moving is performed in a comparator 59 which receives a trip set signal from the CDM 43, which value must be exceeded by the amplitude of the filtered signal from the circuit 58 in order to generate the inhibit signal. In the preferred embodiment, the signal from the circuit 58 must be outside of the range of ±0.3 degrees, or approximately 0.1 Kt./sec.

A delay circuit D prevents the generation of the inhibit signal until a period of 0.4 seconds has elapsed from the time the comparator 59 has generated a high state signal. The delay circuit will provide an immediate indication, i.e. will provide no delay, when the output of the comparator drops to a low state.

Alternatively, the inhibit signal may be generated manually by aircraft operating personnel immediately following the point at which the aircraft comes to rest, in which case the circuitry of FIG. 4a need not be used. Instead, the signal may be generated by manual opening or closing of a switch located in the cockpit of the aircraft.

When the inhibit signal 50 drops to a low value, the instantaneous values of the angle and weight signals A and W are stored in the CDM. These stored signals, designated $A_H$ and $W_H$, are coupled to summing junctions 60,61, respectively, where they are compared with later signals representing the angle and weight on the structural member or bogie beam 20.

The held value of the angle and weight signals $A_H$ and $W_H$ are continuously compared with subsequent angle and weight signals in the summing circuits 60,61 to detect changes in weight and/or beam or axle angle during the time that the aircraft is stationary on the ground. During this time, the outputs from the transducers 22,23 are coupled to the computing circuits 38 and the angle and weight signals developed thereby are coupled to the summing circuits 60,61 respectively, where they are subtracted from the stored values $A_H$ and $W_H$. The signals developed at the outputs of the summing junctions 60,61, denoted $\Delta A$ and $\Delta W$, respectively, are independent of airport ramp or runway tilt, since these terms are cancelled out in the subtraction performed by the summing junctions 60,61.

Moreover, the held values of the angle and weight signals are updated when the sensed aircraft weight drops below the held weight $W_H$. A comparator 62 analyzes the signals W and $W_H$, and when W is less than $W_H$, a reset signal is applied to the latches 56,57 to store the current values of A and W. Accordingly, $A_H$ and $W_H$ are the angle of the structural member and the weight carried thereby at the time when the loading on the member is at its least value since the inhibit signal assumed a low state.

The signals $\Delta A$ and $\Delta W$ are coupled to a tire pressure function block 63 which converts the information from the summing junction 60,61 into tire pressure information based upon these signals.

Figure 5:
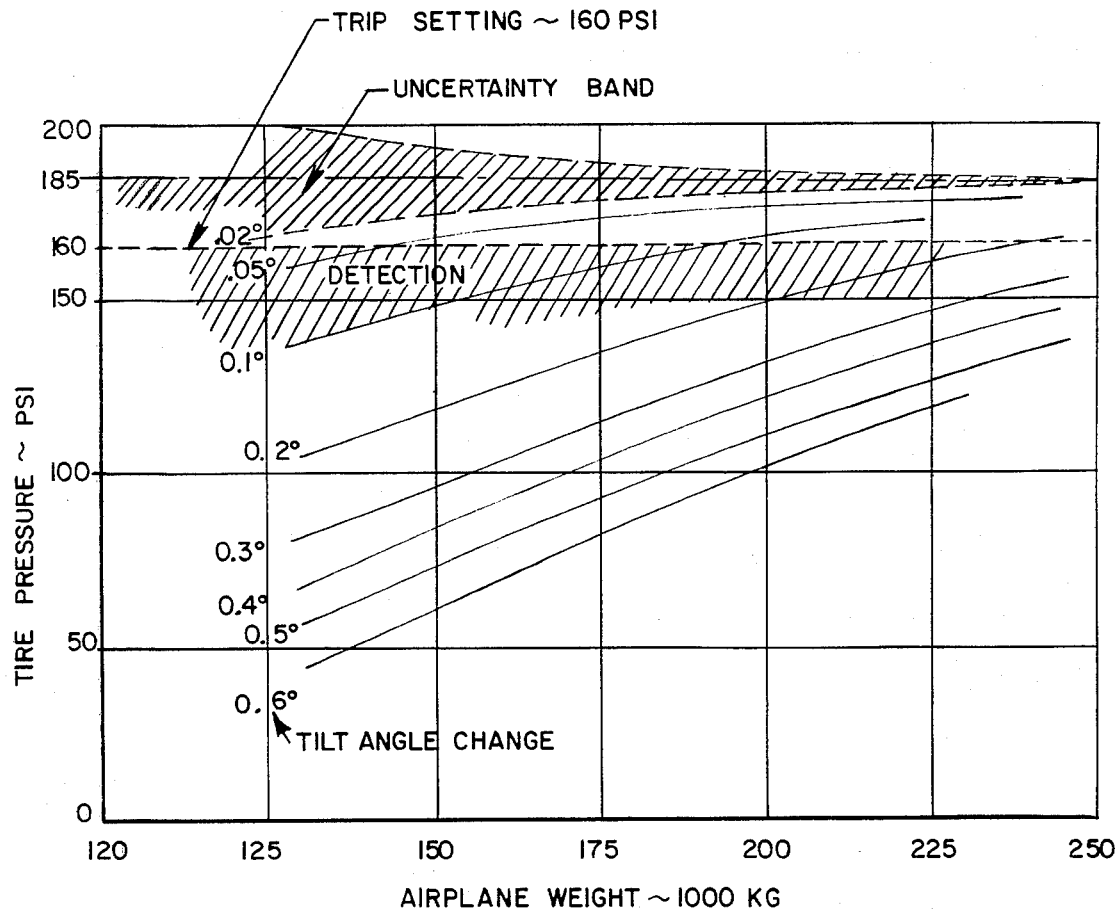
FIG. 5 is a graph illustrating a plurality of tilt angle change curves as a function of differential airplane weight and differential tire pressure.

Referring to FIG. 5, there is illustrated in graphic form the relationship between airplane weight and tire pressure for various measured tilt angles of the structural member on which the tire is mounted. The curves shown in FIG. 5 were obtained by actual measurement of the landing gear of a DC 10 aircraft. The measurements were made by varying the tire pressure of a particular tire and by adjusting the airplane weight to maintain a constant angle of the structural member on which the tire is mounted. The measurements were made for a series of tilt angles to yield the curves shown in FIG. 5. Generally, it has been found for DC 10 aircraft that there is an apparent variation in tilt sensitivity depending upon whether a fore or aft tire on a bogie beam is varied in pressure. Specifically, the sensitivity of the static indicator 46 shown in FIG. 4 is greater for changes in pressure of a tire on the rear of the beam than for a tire on the front of the beam. This effect is related to the stiffness of the fore and aft beam sections resulting from the basic design of the beam. This variation in sensitivity results in an uncertainty band shown in FIG. 5 which limits the overall sensitivity of the system. However, this uncertainty appears to be a second order limitation and by measuring the change in beam tilt with time, or with weight and load changes, the basic low tire pressure sensitivity is approximately 25 psi when tires having a recommended operating pressure of 185 psi are used. The system may be adjusted to generate a low tire indication when a tire pressurization of 160 psi or less is detected.

Generally, the curves shown in FIG. 5 are dependent upon the particular aircraft type with which the system is used. Accordingly, it is necessary to repeat these measurements for each type of aircraft with which the system may be used. Tests have shown that various aircraft of a single type, such as a DC 10, have identical or nearly identical landing gear bending characteristics. Consequently, the measurements described above need be made only for each particular aircraft type and not for each individual aircraft with which the system will be used.

The information shown in FIG. 5 is stored in a lookup table contained in the CDM 42. The lookup table is addressed by the tire pressure function block 63 utilizing the signals $\Delta A$ and $\Delta W$. The block 63 receives from the CDM 43 the value representing tire pressure change stored at the memory position accessed by the signals $\Delta A$ and $\Delta W$, and generates a corresponding signal $P_{T1}$ representing tire pressure.

The tire pressure signal $P_{T1}$ is coupled to a comparator which receives a reference signal over a line 65 representing the limits of the range of acceptable tire pressures. As previously noted, in the preferred embodiment this range corresponds to $\pm 25$ psi. If the signal $P_{t1}$ is less than the lower limit, the comparator 64 generates a high state signal which is coupled to an OR gate 65.

The signal $\Delta A$ is also analyzed to determine whether tire pressure has decreased to an unacceptable value during the time the aircraft has been on the ground. The signal $\Delta A$ is coupled to an amplifier 66 having a variable gain factor K dependent upon aircraft weight. The resultant signal $P_{T2}$, equal to $K\Delta A$, is corrected for loading on the structural member by the amplifier 66 and is compared against the low pressure detector setting from the CDM 43 in a comparator 67. If $P_{T2}$ is less than the lower limit, a signal is coupled to the OR gate 65.

As previously noted, the static indicator is operative only during the time the aircraft 9 is at rest on the ground. When the aircraft is moving, the inhibit signal on the line 50 causes the outputs of the latches 56,57 to follow or "track" the current weight and angle signals, and hence the outputs of the summing junctions 60,61 are equal to zero. This in turn causes the inputs and the output of the OR gate 65 to be in a low state. In order to further insure that the output of the static indicator will be in a low state while the aircraft is moving, one input of an AND gate 70 may be coupled to the output of the OR gate 65. The AND gate 70 also receives a signal from an inverter 71 which complements the inhibit signal on the line 50. Therefore, the output of the AND gate 70 is in a high state only when the output of the OR gate 65 is high and the inhibit signal is low. The AND gate 70 is in turn coupled to the OR gate 52, shown in FIG. 4, to control the actuation of visual or audible alarms or other types of output devices.

It should be noted that the use of the AND gate 70 is optional, it being understood that the output of the OR gate 65 may be coupled directly to the OR gate 52.

The computer 40 shown in FIG. 2 constantly analizes the signals developed by the inclinometers 22-25, 27 and 28 during the time the aircraft is at rest on the ground. When a tire loses sufficient tire pressure during this time, or when a differential tilt of one of the structural members 20,26,29 is detected during loading or unloading of the aircraft due to an underpressurized tire, the computer 40 will generate signals to actuate the output device 54, thereby alerting the aircraft operating personnel as to the existence of a dangerous condition.

Redundant circuitry may be utilized to enhance the reliability of the system. For example, an additional pair of accelerometers may be associated with each bogie beam 20,26, such as the accelerometers 72-75. These accelerometers may be coupled to computing devices 76,77 similar to the computing devices 38,42. The sensitive axes of the two pairs of accelerometers 72,73 and 74,75 may be aligned 180° with respect to one another and parallel to the longitudinal axis of the bogie beam 15 or 17, respectively. The outputs from the computing circuits 76,77 may be processed in exactly the same fashion as was described with respect to FIG. 6 either by the computer 40 or by a separate computer. The output from the computer may be used to drive the output device 54 and/or a second output device 54a. In fact, the two output devices 54,54a may be cross linked with the two computers to provide total redundancy and reliability of operation.

It should be noted that the sensitive axes of the pairs of accelerometers, such as the accelerometers 72,73 may be disposed at right angles to the sensitive axes of the accelerometers 22,23 so that torsion or twist in the bogie beam 20 may be detected. In this way, sensitivity can be increased, since a low tire not only changes the tilt of the associated structural member, but also introduces torsion or twist which is sensed by the extra pair of accelerometers. In this case, the computer 40 (or another computer if used) may be programmed to provide not only an indication of low tire pressure in a particular structural member 20, 26 or 29, but also to identify which tire of the set of tires mounted thereon is underpressurized.

The system described herein utilizes inclinometers to measure deflection or bend of the structural member to overcome the effects of runway and taxiway slopes, in turn increasing tire pressure detection sensitivity without incurring nuisance warnings. The angle signal represents a mechanical characteristic of the structural member functionally related to the weight of the aircraft. The concept can readily be adapted in an identical manner to utilize signals representing mechanical characteristics of the structural member functionally related to the weight of the aircraft from other weight and balance transducers such as a strain gauge or a strain sensitive variable reluctance transducer. The latter sensor measures shear deflection in the structural member, as opposed to measuring the angle or bend in the member. When the variable reluctance sensor is used, it is first necessary to rectify the signals developed thereby before coupling the signals to the computing circuits 38,42,44. However, the remainder of the signal processing would be accomplished in exactly the same way as described above.

I claim:

1. A low tire pressure detection system for detecting an underpressurized condition of a tire mounted on a structural member of an aircraft when the structural member is at rest, comprising:
    first and second inclinometers disposed in spaced-apart relationship on the structural member with the sensitive axes of the inclinometers being parallel to one another, the first and second inclinometers developing first and second output signals representing the angle of the structural member at first and second locations with respect to a reference plane;
    means for summing the first and second output signals to develop a weight signal representing the weight on the member;
    means for subtracting the first and second output signals to develop an angle signal representing the overall angle of the structural member with respect to the reference plane;
    means for storing the weight and angle signals developed at a particular time;
    means for comparing subsequent weight and angle signals with the stored weight and angle signals to derive weight and angle difference signals; and
    means for deriving an indication of tire pressurization including a lookup table in which is stored a plurality of tire pressure signals and means for addressing the lookup table with the weight and angle difference signals to cause the lookup table to develop a signal representing tire pressurization.

2. The low tire pressure detection system of claim 1, wherein the means for deriving includes a look up table in which is stored a plurality of tire pressure values as a function of the angle and weight difference signals.

3. The low tire pressure detection system of claim 1, further including means for comparing the derived tire pressure value against a tire pressure limit to determine whether a low tire pressure condition exists.

4. The low tire pressure detection system of claim 1, further including a variable gain amplifier coupled to the angle difference signal having a gain factor K dependent upon the weight carried by the structural member for deriving a pressure signal representing tire pressure.

5. The low tire pressure detection system of claim 4, further including means for comparing the pressure signal with a tire pressure limit to determine whether a low tire pressure condition exists.

6. The low tire pressure detection system of claim 1, further including means for updating the stored weight and angle signals when a subsequent weight signal is less than the stored weight signal.

7. The low tire pressure detection system of claim 1, further including means for sensing movement of the member and means for inhibiting storage of the weight and angle signals while the member is moving.

8. The low tire pressure detection system of claim 7, wherein the movement sensing means includes means for detecting the presence of particular frequency components in the angle difference signal.

9. The low tire pressure detection system of claim 8, wherein the movement sensing means includes means for generating an inhibit signal when the particular frequency components are present in the angle difference signal.

10. The low tire pressure detection system of claim 8, wherein the detecting means includes a band pass filter for integrating the angle difference signal.

11. The low tire pressure detection system of claim 10, wherein the detecting means includes means for detecting whether the amplitude of the integrated angle difference signal exceeds a predetermined value.

12. A low tire pressure detection system for detecting the existence of an underpressurized tire carried by a structural member of an aircraft, comprising
    first and second accelerometers disposed on opposite ends of the structural member having their sensitive axes disposed 180° with respect to one another for generating first and second accelerometer signals representing the bend of the structural member;
    means for summing the first and second accelerometer signals to derive a weight signal;
    means for subtracting the first and second accelerometer signals to derive an angle signal;
    means for storing the angle signal when the weight signal is at a minimum during an interval;
    means for comparing the stored angle signal with subsequent angle signals to develop an angle difference signal; and
    means for deriving an indication of tire pressure from the weight signal and the angle difference signal.

13. The low tire pressure detection system of claim 12, wherein the deriving means includes a variable gain amplifier coupled to the angle difference signal and to the weight signal having a gain factor K dependent upon the weight on the structural member.

14. A low tire pressure detection system for detecting the existence of an underpressurized tire carried by a structural member of an aircraft, comprising:
    first and second accelerometers disposed on opposite ends of the structural member having their sensitive axes disposed 180° with respect to one another for generating first and second accelerometer signals representing the angle of the structural member at first and second locations;
    means for summing the first and second accelerometer signals to derive a weight signal;
    means for subtracting the first and second accelerometer signals to derive an angle signal;
    means for storing the angle and weight signals when the weight signal is at a minimum during an interval;
    means for comparing the stored angle and weight signals with subsequent angle and weight signals to develop angle and weight difference signals;
    means for deriving a first indication of tire pressure from the weight signal and the angle difference signal; and
    means for deriving a second indication of tire pressure including a lookup table in which is stored a plurality of tire pressure signals and means for addressing the lookup table with the weight and angle difference signals to cause the lookup table to develop a signal representing tire pressurization.

15. A low tire pressure detection system for detecting an underpressurized condition of a tire mounted on a weight-supporting structural member, comprising:
   first and second transducers mounted on the member for developing first and second transducer signals dependent upon the weight supported by the member;
   means coupled to the first and second transducers for developing a weight signal representing the weight carried by the structural member;
   first means coupled to the first and second transducers for subtracting the first and second transducer signals to derive an angle signal representing the angle of the member relative to a reference;
   means for detecting movement of the structural member;
   means for storing the weight and angle signals when the structural member is not moving;
   second means for subtracting subsequent weight and angle signals with the stored weight and angle signals to derive weight and angle difference signals; and
   means for deriving an indication of tire pressurization including a lookup table in which is stored a plurality of tire pressure signals and means for addressing the lookup table with the weight and angle difference signals to cause the lookup table to develop a signal representing tire pressurization.

16. A low tire pressure detection system for detecting an underpressurized condition of a tire mounted on a structural member of an aircraft when the aircraft is not moving comprising:
   means operatively connected to the structural member for generating a first signal representing the weight on the structural member;
   means operatively connected to the structural member for generating a second signal representing a mechanical characteristic of the structural member functionally related to the weight of the aircraft;
   means for storing said first and said second signals at a first time; and
   means for generating at a second time a signal representative of tire pressurization including a lookup table in which is stored a plurality of signals representing tire pressures and means for addressing the lookup table in accordance with the stored first and second signals and the first and second signals.

17. A system for sensing movement of an aircraft having landing gear on the ground comprising:
   means operatively connected to a structural member of the landing gear for generating a signal representing a mechanical characteristic of the strucural member functionally related to the weight of the aircraft, the signal having a particular frequency when the aircraft is moving; and
   means responsive to the frequency of said signal for generating a logic signal indicating aircraft movement on the ground when the particular frequency is present.

* * * * *